United States Patent [19]

Brown

[11] Patent Number: 4,915,075

[45] Date of Patent: Apr. 10, 1990

[54] ACCELERATOR PEDAL POSITION SENSOR

[75] Inventor: Richard L. Brown, Pekin, Ill.

[73] Assignee: Caterpillar Inc., Peoria, Ill.

[21] Appl. No.: 326,129

[22] Filed: Mar. 20, 1989

[51] Int. Cl.⁴ .................... F02D 11/10; H01C 10/00
[52] U.S. Cl. .................... 123/399; 73/118.1;
 74/513; 123/494; 338/153
[58] Field of Search ............ 123/357, 361, 399, 494;
 73/118.1; 324/208; 340/870.38; 338/108, 153;
 74/513

[56] References Cited

U.S. PATENT DOCUMENTS

| 4,519,360 | 5/1985 | Murakami | 123/399 |
| 4,528,590 | 7/1985 | Bisacquino et al. | 338/153 |
| 4,537,168 | 8/1985 | Durisin | 73/118.1 X |
| 4,603,675 | 8/1986 | Junginger et al. | 123/478 |
| 4,612,615 | 9/1986 | Murakami | 364/431.07 |
| 4,718,380 | 1/1988 | Katayose et al. | 123/399 |
| 4,772,829 | 9/1988 | Pickering et al. | 318/139 |

OTHER PUBLICATIONS

News Release titled "Williams WM-516 Electronic Accelerator Designed for Electronic Fuel Control" dated Dec. 5, 1986.

Primary Examiner—Tony M. Argenbright
Attorney, Agent, or Firm—Robert E. Muir; Stephen L. Noe; Kirk Vander Leest

[57] ABSTRACT

Pedal mounted sensors are useful in motor vehicles for delivering an electrical signal correlative to the position of the accelerator pedal. The electrical signal is then used by an engine controller to regulate the amount of fuel supplied to the engine. Some pedal mounted sensors deliver analog signals which are subject to fault conditions which an engine controller can not distinguish from valid operating conditions. Remotely mounted sensors are difficult to install and repair. The subject invention is directed to pedal mounted sensors which have a potentiometer and circuit board hermetically sealed and mounted on a pedal for delivering pulse-width-modulated signal having a duty factor responsive to the pedal position.

7 Claims, 3 Drawing Sheets

Fig-3-
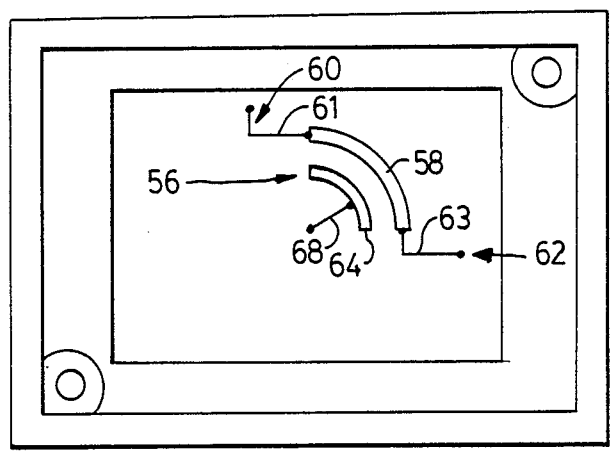
Fig-4-
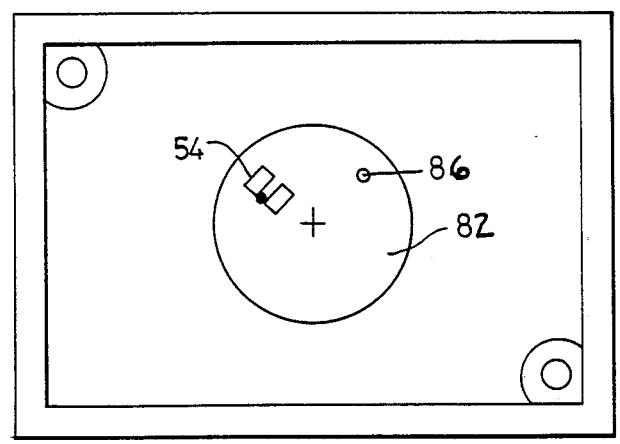

ACCELERATOR PEDAL POSITION SENSOR

DESCRIPTION

1. Technical Field

The present invention relates generally to a system for detecting the position of a control pedal and producing an electrical signal in responsive to the position of the control pedal and, more particularly, to a system for detecting the position of an accelerator pedal of a work vehicle and producing a pulse-width-modulated signal correlative to a desired engine speed.

2. Background Art

In the past, the most common means of communicating a desired engine speed to an engine has been a mechanical linkage from the accelerator pedal to the engine throttle valve. However, modern engines are equipped with electronic engine controllers and it is desirable to replace the mechanical linkage with an electronic equivalent. More particularly, it is desirable to provide a pedal position sensor for delivering an electrical signal which is responsive to the position of the pedal.

It is common in the art to utilize a a pedal mounted potentiometer to produce an analog signal in response to the position of an accelerator pedal. The engine controller receives the analog signal and calculates a desired engine speed based on an empirical derived relationship. In order to eliminate unnecessary mechanical devices, it is preferable to mount the sensor directly on the pedal. In such a location, the potentiometer is subject to a variety of extreme conditions including serious vibration, dust, etc. Therefore, it is possible for a fragile electrical device, such as a potentiometer, to malfunction and produce a signal which is not indicative of the actual pedal position.

U.S. Pat. No. 4,519,360 which issued on May 28, 1985 to Murakami and U.S. Pat. No. 4,603,675 which issued on Aug. 5, 1986 to Junigiger et al. provide systems for detecting when a potentiometer adapted to sense pedal position is malfunctioning. More specifically, both systems indicate when the engine throttle remains open even though the accelerator pedal is fully released. In order to perform this function, both systems require an extra sensor for detecting when the accelerator pedal is fully released. However, even these systems are further subject to inaccuracies induced by electromagnetic interference and wiring harness degradation.

More particularly, electromagnetic interference can interfere with the analog signal produced by the potentiometer thereby providing an inaccurate signal to the engine controller. The greater the distance between the pedal mounted potentiometer and the engine controller, the more likely it is that interference will affect the analog signal. Filters in the engine controller can be used to remove electromagnetic interference from an oscillating portion of the analog signal; however, filters cannot correct for any change in a DC voltage offset induced by the electromagnetic interference. The engine controller can not be programmed to distinguish between a DC offset caused by electromagnetic interference and one correctly representing the accelerator pedal position.

In addition, the above mentioned extreme conditions can also lead to a degradation of the wiring harness used to connect the potentiometer to the engine controller. For example, moisture can induce conductivity between individual wires in the wiring harness, and over time the resistance of individual wires in the wiring harness can change. This wiring harness degradation can induce inaccuracies in the signal received by the engine controller similar to those caused by electromagnetic interference.

Other systems currently address the above mentioned problems by combining a pedal sensing potentiometer and a conditioning circuit in a single signal generating apparatus. The conditioning circuit modifies the analog signal delivered by the potentiometer and produces a pulse-width-modulated signal in response to the accelerator pedal position. Due to the close proximity of the potentiometer and the conditioning circuit, the effects of electromagnetic interference on the analog signal delivered to the conditioning circuit are negligible. Furthermore, the engine controller can be programmed to recognize invalid waveforms in the pulse-width-modulated signal which are caused by electromagnetic interference and wiring harness degradation.

To date, signal generating units having both a potentiometer and conditioning circuit in a single unit are not pedal mounted. Therefore, a mechanical linkage is used to connect the accelerator pedal to the signal generating apparatus. Due to the unit's remote location, installation and maintenance are made difficult, expense is incurred, and a mechanical linkage is once more required by such systems.

The present invention is directed to addressing the above mentioned problems with an apparatus that can be easily mounted directly on an accelerator pedal. Other aspects, objects and advantages can be obtained from a study of the drawings, the disclosure, and the appended claims. While the present invention is described for use with an accelerator pedal it is recognized that such an apparatus could be adapted for use with numerous other control pedals.

DISCLOSURE OF THE INVENTION

In accordance with one aspect of the present invention, there is provided a signal generating apparatus for delivering a pulse-width-modulated signal responsive to the position of a movable mechanical member. A circuit board has a potentiometer mounted on a first side and a conditioning circuit mounted on a second side. The potentiometer has a movable wiper portion in movable contact with a stationary portion. The movable wiper is further connected to and movable with the movable mechanical member. The conditioning circuit is electrically connected to the stationary portion so that the conditioning circuit produces the pulse-width-modulated signal in response to the position of the movable wiper on the stationary portion.

DESCRIPTION OF THE DRAWINGS

FIG. 3 is a diagrammatic sectional partial view taken along line III—III of FIG. 2.

FIG. 4 is a diagrammatic sectional partial view taken along line IV—IV of FIG. 2.

BEST MODE FOR CARRYING OUT THE INVENTION

Figure 1:
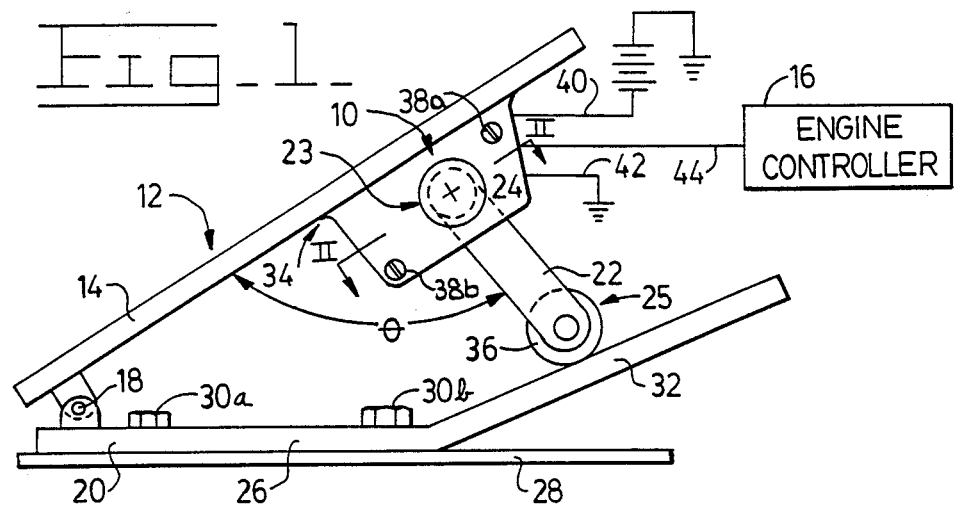
FIG. 1 is a diagrammatic side view of a pedal mounted sensor adapted to deliver a signal in response to the position of the pedal.

FIG. 1 illustrates the relationship between an accelerator pedal unit 12 of a work vehicle (not shown) and a signal generating apparatus 10. The signal generating apparatus 10 produces a pulse-width-modulated signal having a duty factor responsive to the position of the pedal 14, and delivers the signal to an engine controller 16. The pedal 14 is illustrative and the signal generating apparatus 10 can be adapted for use with other movable mechanical members. In a preferred embodiment the accelerator pedal unit 12 is a series WM-516 manufactured by Williams Precision Controls of Portland, Oreg., and includes the pedal 14, a hinge 18, a baseplate 20, a lever 22, and a pin 24. The base plate 20 has a horizontal portion 26 rigidly attached to the vehicle frame 28 by anchor bolts 30a–30c, for example. The base plate 20 further includes an angled portion 32 which is fixed relative to the vehicle frame 28. The pedal 14 is pivotally movable about the hinge 18 relative to the work vehicle frame 28. Preferably the hinge 18 can be positioned on the base plate horizontal portion 26 as shown; however, the hinge 18 can also be rigidly attached to the vehicle frame 28.

The pedal 14 is movable between a first position corresponding to engine idle speed and a second position corresponding to maximum engine speed. A pedal return spring (not shown) biases the pedal 14 to the first position. The pin 24 is positioned on the pedal lower portion 34 and is rotatable relative to and in response to pivotal movement of the pedal 14 by the lever 22. The lever 22 has first and second end portions 23,25. The lever first end portion 23 is fixedly connected to the pin 24 and the lever second end portion 25 includes a roller 36 in contact with and movable along the base plate angled portion 32 in response to movement of the pedal 14.

In a preferred embodiment, a pair of connecting bolts 38a,38b are used to attach the signal generating apparatus 10 to the pedal 14. However, it is foreseeable to accomplish this connecting function using adhesives or other fasteners. The signal generating apparatus 10 is electrically connected to a source of positive battery voltage, to ground, and to the engine controller 16 by respective wires 40, 42, and 44.

Figure 2:
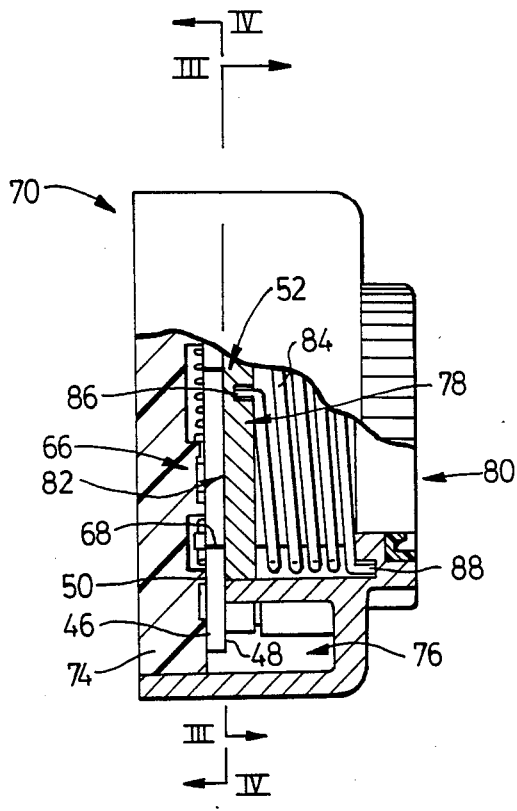
FIG. 2 is a diagrammatic sectional partial view taken along line II—II of FIG. 1.
Figure 5:
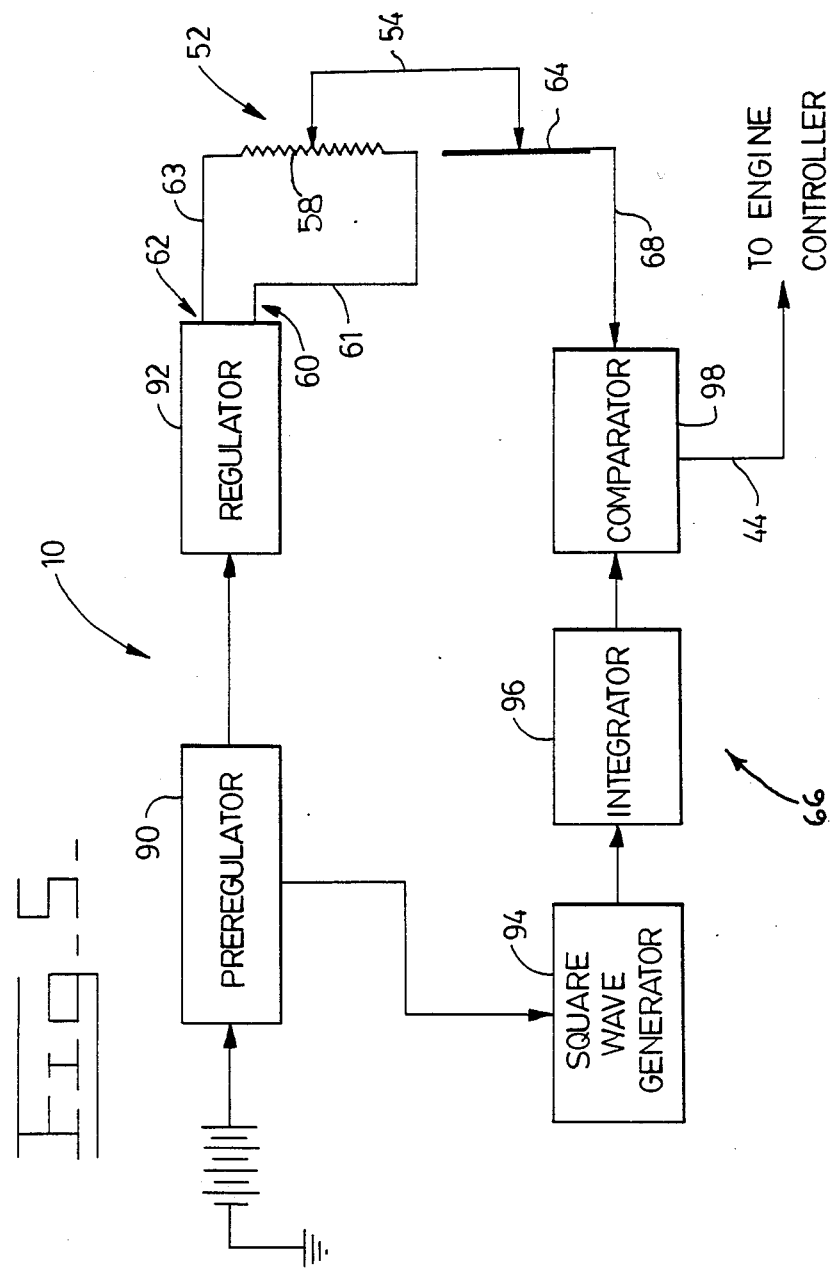
FIG. 5 is a functional block diagram of an embodiment of the pedal mounted position sensor of FIG. 1.

Referring now to FIGS. 2, 3, and 4, a circuit board 46 has first and second sides 48,50. A rotatable potentiometer 52 has a movable wiper 54 in movable contact with a stationary portion 56. The potentiometer is positioned on the circuit board first side 48, and delivers a DC voltage in responsive to the position of the pedal 14 shown in FIG. 1. The potentiometer stationary portion 56 includes a resistive strip 58 and a conductive strip 64. The resistive strip is connected between a first voltage source 60 and a higher potential second voltage source 62 by respective wires 61 and 63. Preferably the resistive strip 58 and the conductive strip 64 are screen printed on the circuit board first side 48; however, it is foreseeable to position the strips 58,64 on the circuit board first side 48 using methods such as etching, insert molding, compression molding, etc. The movable wiper 54 is of negligible resistance and effectively forms a short circuit from the resistive strip 58 to the conductive strip 64. Thus, the entire conductive strip 64 is maintained at DC voltage potential correlative to the position of the movable wiper 54 on the resistive strip 58. One skilled in the art will recognize that the potentiometer 52 could be replaced, for example, by a variable capacitance or inductance device.

A conditioning circuit 66 is located on the circuit board second side 50 and is electrically connected to the conductive strip 64 by a wire 68. The conditioning circuit 66 receives the DC voltage delivered by the potentiometer 52 and delivers a pulse-width-modulated signal having a duty factor responsive to this DC voltage on the wire 44.

A housing 70 is of sufficient size to contain the conditioning circuit 66, the circuit board 46 and the potentiometer 52. In the preferred embodiment, the housing 70 is constructed of polyetherimide, but the housing 70 could be formed from numerous other materials. An epoxy resin 74 filling the void 76 between the housing 70 and the circuit board 46 hermetically seals the conditioning circuit 66, circuit board 46 and potentiometer 52 within the housing 70. The housing 70 and epoxy resin 74 support the circuitry and protect against possible malfunctions such as short circuits and broken wires within the signal generating apparatus 10.

The housing 70 includes a molded rotor 78 having a first end 80 integrally engaging and movable with the pin 24, shown in FIG. 1, and a second end 82 fixedly connected to the movable wiper 54. Thus, when the pin 24 rotates, the movable wiper 54 moves along the resistive strip 58 causing the potentiometer 52 to deliver a DC voltage correlative to the position of the pin 24. The molded rotor 78 can be constructed of any one of numerous nonconductive materials but is preferably polyetherimide. A return spring 84 has a first end 86 connected to the molded rotor second end 82 and a second end 88 connected to the housing 70, and is adapted to bias the molded rotor 78 to a preselected position.

Turning now to FIG. 4., a block diagram illustrates the functional aspects of the signal generating apparatus 10. These functional aspects are common in the industry; therefore, the exact circuitry will not be defined. A voltage preregulator 90 filters noise from and regulates the battery voltage to a level usable by the remaining electrical circuitry of the signal generating apparatus 10. In the preferred embodiment, battery voltage ranges from approximately +9 to +32 volts and the preregulator 90 delivers approximately a +10 volt signal. A voltage regulator 92 receives this preregulated voltage and delivers the first voltage potential on the wire 61 and the second voltage potential on the wire 63. In the preferred embodiment the first voltage source 60 is +0.7 volts and the second voltage source 62 is +5.7 volts; however, it is recognized that numerous other voltages may be chosen without departing from the invention. In the preferred embodiment, the voltage preregulator 90 and voltage regulator 92 are both located on the circuit board second side 48.

As previously stated, the resistive strip 58 is connected between the first and second voltage sources 60,62. The movable wiper 54 forms a short circuit from the resistive strip 58 to the conductive strip 64, causing the potentiometer 52 to deliver a DC voltage signal correlative to the position of the movable wiper 54 on the resistive strip 58. A wire 68 connects the conductive strip 64 to the conditioning circuit 66 such that the DC voltage signal delivered by the potentiometer 52 is received by the conditioning circuit 66.

In the preferred embodiment, the conditioning circuit 66 includes a square wave generator 94, an integrator 96, and a comparator 98. The square wave generator 94 receives the preregulated voltage from the voltage preregulator 90 and delivers a square wave signal having a predetermined amplitude and base frequency. The integrator 96 integrates this square wave signal and delivers a triangular wave signal having a predetermined amplitude and base frequency. In the preferred embodiment the triangular wave signal has an amplitude of +5 volts. The comparator 98 compares the triangular wave signal to the DC voltage signal produced by the potentiometer 52 and delivers a pulse-width-modulated signal having a duty factor responsive to the DC voltage signal. It is foreseeable that components other than those used in the preferred embodiment could be used for generating the pulse-width-modulated signal.

INDUSTRIAL APPLICABILITY

Assume that the signal generating apparatus 10 is mounted on the accelerator pedal of a work vehicle, not shown. Initially, the pedal 14 is biased to a predetermined position by a pedal return spring (not shown). At this predetermined position, an angle (theta) between the lever 22 and the pedal 14 is obtuse and the signal generating apparatus 10 produces a pulse-width-modulated signal having a duty factor representative of the initial pedal position. The engine controller 16 receives the pulse-width-modulated signal and calculates a desired engine speed based on the empirical relationship.

Subsequently, if a vehicle operator desires an increase in the engine speed the operator applies a force "F" to the accelerator pedal 14. As the operator applies the force "F", the pedal 14 rotates relative to the vehicle frame 28 about hinge 18 to a second position. As the pedal 14 is displaced from the first position to the second position, the lever 22 and pin 14 rotate relative to the pedal 14 in a preselected direction such that the angle (theta) increases in magnitude.

Rotation of the pin 24, causes the movable wiper 54 to rotate along the resistive strip 58 between first and second positions corresponding to the pedal first and second positions, respectively. The movable wiper 54 effectively forms a short circuit from the resistive strip 58 to the conductive strip 64; therefor, the entire conductive strip 64 has a DC voltage potential correlative to the position of the wiper 54 on the resistive strip 58. Thus, the potentiometer 52 delivers a DC voltage signal over the wire 68 responsive to the conductive strip voltage potential.

The conditioning circuit 66 receives the DC voltage signal from the potentiometer 52 and produces a pulse-width-modulated signal having a duty factor responsive to the DC voltage signal.

Because there is no appreciable distance between potentiometer 52 and the conditioning circuit 66, the effects of electromagnetic interference on the analog signal delivered to the conditioning circuit 66 are negligible. Additionally, in the event that electromagnetic interference or wiring harness degradation change the frequency or the DC level of pulse-width-modulated signals produced by the conditioning circuit 66, the engine controller 16 can be programmed to recognize invalid waveforms caused by such interference and wiring harness degradation.

The engine controller 16 receives the pulse-width-modulated signal and regulates the engines speed in response to the duty factor of the pulse-width-modulated signal. The engine controller 16 can be programmed to reduce the amount of fuel supplied to the engine to a preselected minimum in response to invalid waveforms in the pulse-width-modulated signal. For instance, if any of the wires 40,42,44 break, short, or become disconnected, a high signal is continuously delivered by the signal generating apparatus 10. The engine controller 16 in turn can be programmed to reduce the amount of fuel supplied to the engine to a preselected minimum upon receiving a continuous high signal for a predetermined period of time.

Other aspects, objects, and advantages of this invention can be obtained from a study of the drawings, the disclosure, and the appended claims.

I claim:

1. A signal generating apparatus for delivering a pulse-width-modulated signal responsive to the position of a movable mechanical member, comprising:
    a circuit board having first and second sides;
    a potentiometer having a movable wiper and a stationary portion, said movable wiper being in movable contact with said stationary portion, said movable wiper and said stationary portion being positioned on said circuit board first side and said movable wiper being connected to and movable with said movable mechanical member; and,
    a conditioning circuit being positioned on said circuit board second side, electrically connected to said potentiometer stationary portion and adapted to deliver said pulse-width-modulated signal responsive to the position of said movable wiper on said potentiometer stationary portion.

2. The apparatus set forth in claim 1 wherein said potentiometer stationary portion includes:
    a resistive strip connectable between a first voltage potential and a second voltage potential higher than said first voltage potential; and,
    a conductive strip connected to said conditioning circuit.

3. The apparatus set forth in claim 2, wherein said movable wiper forms a short circuit from said resistive strip to said conductive strip at a position where said movable wiper contacts said resistive strip.

4. A signal generating apparatus for delivering a pulse-width-modulated signal responsive to the position of a pedal in a work vehicle, comprising:
    a work vehicle frame;
    a pedal having a pin, said pedal being pivotally movable relative to said work vehicle frame between first and second positions, said pin being positioned on said pedal and rotatable relative to said pedal in response to movement of said pedal relative to said work vehicle frame;
    a circuit board having first and second sides;
    a rotatable potentiometer having a rotatable wiper and a stationary portion, said rotatable wiper being in movable contact with said stationary portion, said rotatable wiper and said stationary portion being positioned on said circuit board first side, and said rotatable wiper being connected to and movable with said pin;
    a conditioning circuit being positioned on said circuit board second side, electrically connected to said potentiometer stationary portion and adapted to deliver said pulse-width-modulated signal in response to the position of said movable wiper on said potentiometer stationary portion; and,
    a means for rotating said pin in response to movement of said pedal.

5. The apparatus set forth in claim 4 including a housing of a size sufficient for containing said conditioning circuit, said potentiometer, and said circuit board; and,
   a means for hermetically sealing said conditioning circuit, said potentiometer, and said circuit board within said housing.

6. The apparatus set forth in claim 4 wherein said pin rotating means includes:
   a rigid base plate having an angled portion, said angled portion being fixed relative to said vehicle frame; and,
   a lever having first and second end portions, said lever first end portion being fixedly connected to said pin, and said lever second end portion having a roller in contact with and movable along said base plate angled portion in response to movement of said pedal.

7. The apparatus set forth in claim 5 wherein said housing includes:
   a molded rotor having first and second ends, said molded rotor first end integrally engaging said pin, said molded rotor second end being fixedly connected to said rotatable wiper; and,
   a return spring having first end connected to said molded rotor, a second end connected to said housing, and being adapted to bias said molded rotor to a preselected position.

* * * * *